(12) United States Patent
Putaala et al.

(10) Patent No.: US 12,433,921 B2
(45) Date of Patent: Oct. 7, 2025

(54) BACTERIA

(71) Applicant: DUPONT NUTRITION BIOSCIENCES APS, Copenhagen K (DK)

(72) Inventors: Heli Putaala, Kantvik (FI); Sofia Forssten, Kantvik (FI); Sampo Lahtinen, Kantvik (FI); Arthur Ouwehand, Kantvik (FI); Jaana Mättö, Helsinki (FI); Harri Mäkivuokko, Helsinki (FI); Inger Mattsby-Baltzer, Gothenburg (SE); Björn Andersch, Särö (SE)

(73) Assignee: INTERNATIONAL N&H DENMARK APS, Kongens Lyngby (DK)

(*) Notice: Subject to any disclaimer, the term of this patent is extended or adjusted under 35 U.S.C. 154(b) by 361 days.

(21) Appl. No.: 17/579,006

(22) Filed: Jan. 19, 2022

(65) Prior Publication Data

US 2022/0354908 A1    Nov. 10, 2022

Related U.S. Application Data

(63) Continuation of application No. 16/332,912, filed as application No. PCT/EP2017/072919 on Sep. 12, 2017, now abandoned.

(30) Foreign Application Priority Data

Sep. 16, 2016  (EP) .................... 16189292

(51) Int. Cl.
| | | |
|---|---|---|
| *A61K 35/747* | (2015.01) | |
| *A61K 35/745* | (2015.01) | |
| *A61P 31/00* | (2006.01) | |
| *C12N 1/20* | (2006.01) | |
| *C12Q 1/28* | (2006.01) | |
| *C12R 1/225* | (2006.01) | |

(52) U.S. Cl.
CPC .......... *A61K 35/747* (2013.01); *A61K 35/745* (2013.01); *A61P 31/00* (2018.01); *C12N 1/20* (2013.01); *C12N 1/205* (2021.05); *C12Q 1/28* (2013.01); *C12R 2001/225* (2021.05)

(58) Field of Classification Search
None
See application file for complete search history.

(56) References Cited

U.S. PATENT DOCUMENTS

2008/0131462 A1* 6/2008 Graf .................. C12N 1/205
424/246.1
2024/0245735 A1    7/2024 Novakovic et al.

FOREIGN PATENT DOCUMENTS

| KR | 20050025002 A | 3/2005 |
|---|---|---|
| WO | 98/46261 | 10/1998 |
| WO | 00/35465 | 6/2000 |
| WO | 2006/045473 A1 | 5/2006 |
| WO | 2011013106 A1 | 2/2011 |
| WO | 2018/050623 A1 | 3/2018 |

OTHER PUBLICATIONS

Osset et al. (JID 2001;183. Feb. 1). (Year: 2001).*
Non-final Office action for U.S. Appl. No. 18/364,151 (Mar. 13, 2025).
Final Office action for U.S. Appl. No. 16/333,770 (Feb. 2, 2023).
Non-final Office action for U.S. Appl. No. 16/333,770 (Apr. 11, 2022).
Antonio et al., "Colonization of the Rectum by *Lactobacillus* Species and Decreased Risk of Bacterial Vaginosis", JID, 2005, vol. 192, pp. 394-398.
Apajalahti, et al., "Culture-Independent Microbial Community Analysis Reveals that Inulin in the Diet Primarily Affects Previously Unknown Bacteria in the Mouse Cecum", Applied and Environmental Microbiology, 2002, vol. 68, No. 10, pp. 4986-4995.
Gilbert et al., "Clinical Features of Bacterial Vaginosis in a Murine Model of Vaginal Infection with Gardnerella vaginalis", PLOS ONE, 2013, https://doi.org/10.1371/journal.pone.0059539.
International Preliminary Report on Patentability for PCT/EP2017/072919 issued Mar. 19, 2019.
Rabe et al., "Optimization of Media for Detection of Hydrogen Peroxide Production by *Lactobacillus* Species", Journal of Clinical Microbiology, 2003, vol. 41, No. 7, pp. 3260-3264.
Saarela, et al., "Stationary-phase acid and heat treatments for improvement of the viability of probiotic lactobacilli and bifidobacteria", Journal of Applied Microbiology, 2004, vol. 96, pp. 1205-1214.
Singleton, et al., Dictionary of Microbiology and Molecular Biology, third edition, revised, John Wiley & Sons Ltd., 2006, ISBN: 0-470-03545-5.
Srinivasan et al., "The Human Vaginal Bacterial Biota and Bacterial Vaginosis", Hindawi Publishing Corporation, vol. 2008, Article ID 750479, 22 pages (2008).
Zarate et al., "Influence of Priobiotic vaginal lactobacilli on in vitro adhesion of urogenital pathogens to vaginal epithelial cells", Letters in Applied Microbiology, 2006, vol. 43, pp. 174-180.
The HarperCollins Dictionary; Biology, W.G. Hale and J.P. Margham, 1991.
International Search Report for International Application No. PCT/EP2017/072919, International Filing Dated Dec. 12, 2017.

(Continued)

*Primary Examiner* — Jana A Hines
*Assistant Examiner* — Khatol S Shahnan Shah

(57) ABSTRACT

The present invention relates to bacteria and metabolites thereof that are capable of binding to vaginal cells and producing hydrogen peroxide, their use in probiotic compositions and food products and methods for their selection. The invention also relates to the use of said bacteria, metabolites and probiotic compositions for the prevention and/or treatment of urogenital disorders.

7 Claims, 2 Drawing Sheets

(56) References Cited

OTHER PUBLICATIONS

XP-002768008; "New acid tolerant probiotic Lactobacillus reuteri probio-054 that can suppress the growth of pathogenic microorganisms, for treating or preventing symptoms from abnormal fermentation of microorganisms".
Non-final OA from parent U.S. Appl. No. 16/332,912 dated Jul. 19, 2021.

* cited by examiner

BACTERIA

CROSS-REFERENCE TO RELATED PATENT APPLICATIONS

This patent claims priority as a continuation under 35 USC § 120 to U.S. application Ser. No. 16/332,912 (filed Mar. 13, 2019; now abandoned), which, in turn, claims priority under 35 USC § 371 as a national phase of Intl Patent Appl. PCT/EP2017/072919 (filed Sep. 12, 2017; and published Mar. 22, 2018 as Intl Publ. No. WO2018/050650), which, in turn, claims priority to European Patent Appl. No. 16189292.2 (filed Sep. 16, 2016). The entire texts of the above-referenced patent applications are incorporated by reference into this patent.

FIELD OF THE INVENTION

The present invention relates to novel bacteria and metabolites thereof, their use in probiotic compositions and food products and methods for selection of probiotic bacteria. The invention also relates to the use of said bacteria, metabolites and compositions for the prevention and/or treatment of urogenital disorders.

BACKGROUND

The human body is colonised with a myriad of microbes representing over 1000 bacterial species. The composition and density of the microbiota is specific for each body location. The majority of the bacterial biomass resides in the gastrointestinal tract (GIT), especially in the lumen of the large intestine, where two populations are present, the lumen and mucosa-associated populations that differ from each other. The microbiota has an important role in human health. It contributes to the maturation of the gut tissue, to host nutrition, pathogen resistance, epithelial cell proliferation, host energy metabolism and immune response. An altered composition and diversity of the GIT microbiota has been associated with several diseases, such as inflammatory bowel disease (IBD), irritable bowel syndrome (IBS), rheumatoid arthritis, atopic eczema, asthma and type 1 diabetes.

The microbiota of adults is fairly stable over time and unique within an individual. The similarity of the dominant microbial population is higher in monozygotic twins compared to unrelated subject suggesting the role of host genetic factors on the microbiota composition. Some animal studies suggest that the major histocompatibility complex is involved in the genetic regulation of gut microbiota. However, little is known about which genes or other factors determine or regulate the spectrum of microbial composition.

The mucosal layer covering the gut epithelium has an important role as the first layer of host defences, but it also enables contacts between intestinal microbiota and the host. The mucus is mainly composed of mucins, large glycoproteins containing a protein core and attached oligosaccharides. Although the mucus layer prevents the direct contact of the bacteria with the epithelial cells in the colon, it provides adhesion sites for the GIT bacteria and has thus an important role in bacterial colonization. Besides adhesion sites, the secreted mucus provides endogenous substrate for bacteria. The mucus may be a major nutrient source in situations, where carbohydrates originating elsewhere are limited.

In addition to the microbiota of the gut, other mucosal tissues, such as the urogenital tract, skin, oral and nasal tissues, have their own repertoire of commensal microbes. The balance of the microbiota in these tissues is similarly important to the well-being of the host. Not much is known yet of the spectrum of microbes in these tissues. In healthy vagina, several species of *Lactobacillus* spp. including *L. crispatus, L. gasseri, L. jensenii* and *L. iners* predominate. In bacterial vaginitis, the balance of the microbiota is shifted towards colonisation by anaerobes, especially *Gardnerella vaginalis, Atopobium* spp, several *Prevotella* spp. such as *P. bivia* and *P. buccalis,* and *Megaspaera* spp. may be commonly detected (Srinivasan and Fredricks 2008).

Many probiotic supplements and microbiota modulation products currently available on the market are ineffective in promoting the desired health effects for every individual and effect commonly varies from person to person. Thus, there is a continuous need for more specific or personally tailored products that are able to mediate the health effects more efficiently.

SUMMARY OF THE INVENTION

The present invention is based on the inventors surprising discovery that certain bacterial strains show an inhibitory effect on urogenital tract pathogens by production of antimicrobial substances and competitive exclusion of urogenital tract pathogen colonization in in vitro epithelial cell models. Further, some of these strains demonstrate good bile and/or acid tolerance, meaning that they can tolerate conditions in the gastrointestinal tract and hence are particularly suitable for use in an orally administered product. Without wishing to be bound by theory, it may be that oral administration of probiotic strains improves urogenital health by enhancing the intestinal mucosal immunity which affects vaginal immunity, rendering the environment less receptive to pathogens. One potential mechanism for pathogen inhibition by probiotic strains is production of hydrogen peroxide production. Another potential mechanism is the production of lactic acid, bacteoricins and other microbial metabolites by the probiotic strains. Furthermore, probiotic strains may help to increase ascension of probiotic and/or indigenous lactobacilli from the rectal skin to the vagina, and/or reduce ascension of pathogens from the rectal skin to the vagina.

Accordingly the present invention provides a bacterium or metabolite thereof characterised by:
a) a binding affinity in an assay for in vitro vaginal cell adhesion of at least 1.0 when compared to *Lactobacillus helveticus* LH0138 ; and
b) a hydrogen peroxide production level of more than 1128581 measured as fluorescence counts produced during 1.5 hours when determined in a hydrogen peroxide production assay herein and/or a level higher than that of *Lactobacillus reuteri* RC-14.

The bacterium or metabolite thereof according to the invention may be further characterised by:
c) more than −2.6 average acid tolerance represented as a log change when measured at pH 2.5 for 1.5 hours as defined in an acid resistance assay; and/or
d) more than 40% average bile tolerance represented as growth in 0.9% dehydrated fresh bile as a percentage of growth in MRS without bile as defined in a bile resistance assay.

The bacterium of the invention may be a bacterial strain deposited as DSM 32101, DSM 32108, DSM 32107, DSM 32100, DSM 32109, DSM 32113, DSM 32103, DSM 32102, DSM 32097, DSM 32115 or a mutant, a variant and/or a progeny thereof.

According to another aspect of the present invention there is provided a probiotic composition comprising a bacterium or metabolite thereof according to the invention and a suitable carrier.

The probiotic composition of the invention may comprise a combination of 2, 3, 4, 5 or 6 bacterial strains or metabolites thereof according to the invention, optionally in combination with one or more further bacterial strains.

In one embodiment, the probiotic composition of the invention further comprises one or more strains selected from: *Lactobacillus acidophilus* NCFM; *Bifidobacterium lactis* BL-04; *Lactobacillus paracasei* LPC37; *Bifidobacterium lactis* HN019, *Lactobacillus rhamnosus* HN001, *Lactobacillus acidophilus* La-14 and/or *Bifidobacterium lactis* Bi-07.

In one embodiment, the probiotic composition of the invention further comprises one or more strains such as *Lactobacillus acidophilus* NCFM, *Lactobacillus rhamnosus* HN001, *Bifidobacterium lactis* HN019, *Bifidobacterium breve* Bb-03, *Bifidobacterium lactis* Bi-07, *Bifidobacterium lactis* Bl-04, *Bifidobacterium longum* Bl-05, *Lactobacillus acidophilus* La-14, *Lactobacillus bulgaricus* Lb-64, *Lactobacillus brevis* Lbr-35, *Lactobacillus casei* Lc-11, *Lactococcus lactis* Ll-23, *Lactobacillus plantarum* Lp-115, *Lactobacillus paracasei* Lpc-37, *Lactobacillus rhamnosus* Lr-32, *Lactobacillus salivarius* Ls-33, *Streptococcus thermophilus* St-21, *Lactobacillus rhamnosus* GG, *Bifidobacterium lactis* Bb-12, *Lactobacillus rhamnosus* GR-1, *Lactobacillus reuteri* RC-14, *Lactobacillus rhamnosus* Rose11-11, *Lactobacillus helveticus* Rosen-52, *Lactobacifflus helveticus* LAFTI L10, *Lactobacillus casei* HA-108, *Lactobacillus rhamnosus* HA-111, *Lactobacillus brevis* HA-112, *Lactobacillus plantarum* HA-119, *Lactobacillus fermentum* HA-179, *Lactobacillus reuteri* HA-188.

The probiotic composition may further comprise a prebiotic component.

The present invention also provides a method of producing a probiotic composition of the invention, the method comprising combining the selected bacterium or metabolite thereof with a suitable carrier.

The invention further provides a food product comprising a probiotic composition according to the invention.

According to another aspect of the invention, a bacterium or metabolite thereof is provided having a binding affinity value in an assay for in vitro vaginal cell adhesion to of at least 1.0 when compared to *Lactobacillus helveticus* LH0138.

According to another aspect of the invention there is provided a method of selecting a bacterium or metabolite thereof comprising:
a) assaying vaginal cell adhesion using a method comprising:
   i) growing one or more test bacteria;
   ii) growing a control culture of *Lactobacillus helveticus* LH0138;
   iii) incubating the one or more test bacteria and the control culture of *Lactobacillus helveticus* LH0138 with one or more vaginal epithelial cells;
   iv) measuring the adhesion of the test bacteria and control to the one or more vaginal epithelial cells; and
b) assaying hydrogen peroxide production using a method comprising:
   i) growing one or more test bacteria;
   ii) growing a *Lactobacillus reuteri* RC-14 control culture;
   iii) incubating the one or more test bacteria and the control culture for the same period of time;
   iv) measuring the hydrogen peroxide production in the one or more test bacteria and the control(s); and
c) selecting bacteria which adhere to the one or more vaginal epithelial cells with an affinity of at least 100% when compared to the *Lactobacillus helveticus* LH0138 control and which produce more hydrogen peroxide than the *Lactobacillus reuteri* RC-14 control culture.

In one embodiment, the incubation test bacteria and controls in steps a) iii) and b) iii) are incubated in separate vials.

In another aspect, the method further comprises:
d) assaying the average acid tolerance of the bacteria selected in step c) at pH 2.5 for 1.5 hours; and/or
e) assaying the average bile tolerance of the bacteria selected in step c) in 0.9% bile; and
f) selecting one or more bacteria having more than −2.6 average acid tolerance represented as a log change when measured at pH 2.5 for 1.5 hours and/or more than 40% average bile tolerance represented as growth in 0.9% bile as a percentage of growth in MRS without bile.

The invention further provides a bacterium or metabolite thereof selected by the method of the invention.

In a further aspect, the invention provides the use of a bacterium or metabolite of the invention or selected by a method of the invention, or a probiotic composition of the invention, for the manufacture of a formulation for preventing and/or treating urogenital disorders.

The invention also provides a bacterium or metabolite of the invention or selected by a method of the invention, or a probiotic composition of the invention, for use in preventing and/or treating urogenital disorders.

In one embodiment, the use, a bacterium or metabolite for use, is further for preventing and/or treating gastrointestinal disorders.

In another aspect, the invention provides a method of preventing and/or treating urogenital disorders comprising administering to a subject a bacterium or metabolite thereof according to the invention or selected by a method of the invention, or a probiotic composition of the invention, in a pharmaceutically effective amount.

In another embodiment, the method is further for preventing and/or treating gastrointestinal disorders.

BRIEF DESCRIPTION OF THE DRAWINGS

Embodiments of the invention will now be described, by way of example only, with reference to accompanying drawings, in which.

DETAILED DESCRIPTION

Figure 1:
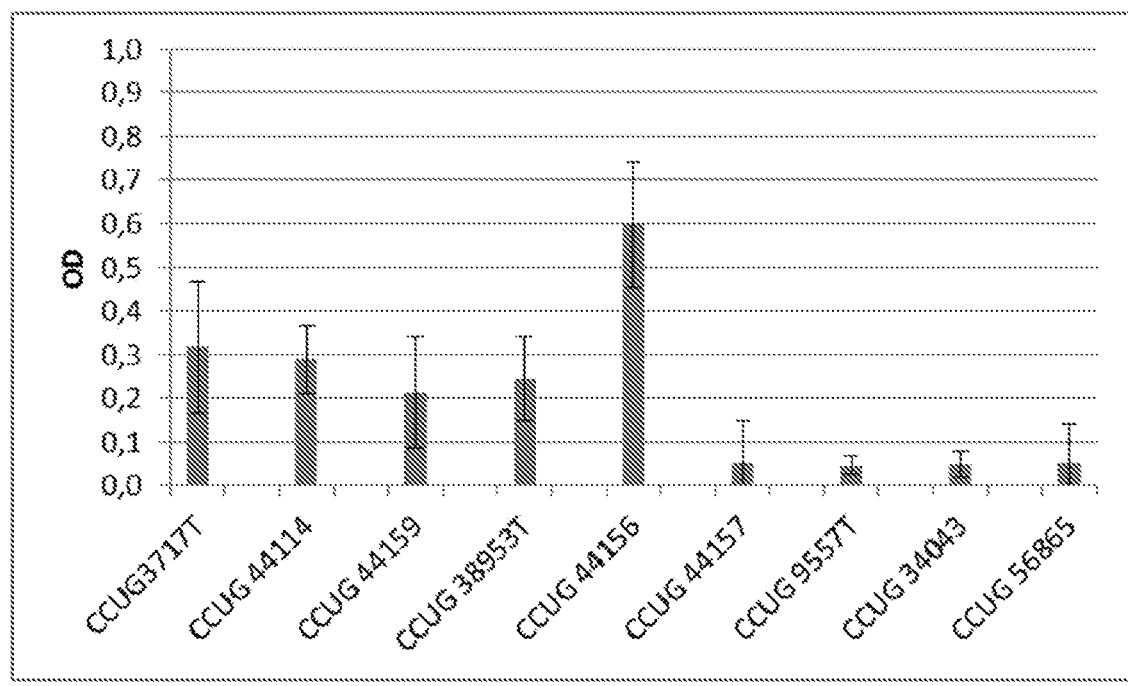
FIG. 1. shows the growth of pathogens in GEM media supplemented with 10% horse serum.

Unless defined otherwise, all technical and scientific terms used herein have the same meaning as commonly understood by one of ordinary skill in the art to which this disclosure belongs. Singleton, et al., DICTIONARY OF MICROBIOLOGY AND MOLECULAR BIOLOGY, 20 ED., John Wiley and Sons, New York (1994), and Hale & Marham, THE HARPER COLLINS DICTIONARY OF BIOLOGY, Harper Perennial, NY (1991) provide one of skill with a general dictionary of many of the terms used in this disclosure.

This disclosure is not limited by the exemplary methods and materials disclosed herein, and any methods and materials similar or equivalent to those described herein can be used in the practice or testing of embodiments of this disclosure. Numeric ranges are inclusive of the numbers defining the range.

The headings provided herein are not limitations of the various aspects or embodiments of this disclosure which can be had by reference to the specification as a whole. Accordingly, the terms defined immediately below are more fully defined by reference to the specification as a whole.

Other definitions of terms may appear throughout the specification. Before the exemplary embodiments are described in more detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within this disclosure. The upper and lower limits of these smaller ranges may independently be included or excluded in the range, and each range where either, neither or both limits are included in the smaller ranges is also encompassed within this disclosure, subject to any specifically excluded limit in the stated range. Where the stated range includes one or both of the limits, ranges excluding either or both of those included limits are also included in this disclosure.

It must be noted that as used herein and in the appended claims, the singular forms "a", "an", and "the" include plural referents unless the context clearly dictates otherwise.

The publications discussed herein are provided solely for their disclosure prior to the filing date of the present application. Nothing herein is to be construed as an admission that such publications constitute prior art to the claims appended hereto.

It will be understood that in the following, preferred embodiments referred to in relation to one broad aspect of the invention are equally applicable to each of the other broad aspects of the present invention described herein. It will be further understood that, unless the context dictates otherwise, the preferred embodiments described herein may be combined.

The term "bacterium" or "bacterial" is used herein to refer to any bacterial species, strains or combinations thereof, and is not limited to strains currently accepted as probiotics. However, bacterial strains used in the present invention are those that are suitable for human and/or animal consumption. A skilled person will be readily aware of specific species and or strains from within the genera described herein which are used in the food and/or agricultural industries and which are generally considered suitable for human and/or animal consumption. Such bacterial strains are typically non-pathogenic, and may be generally regarded as safe for human use (e.g. GRAS).

The term "bacterium" is generally used to refer to whole bacteria, for example whole viable bacteria.

Bacteria suitable for use in the present invention include, but are not limited to, *Bifidobacterium, Brevibacterium, Propionibacterium, Lactococcus, Streptococcus, Lactobacillus, Enterococcus, Pediococcus, Leuconostoc* and/or *Oenococcus*.

In one embodiment the bacterium belongs to the genus *Lactobacillus*. Suitable strains of *Lactobacillus* include *L. acidophilus, L. amylovorus, L. brevis, L. casei, L. crispatus, L. fermentum, L. vaginalis, L. curvatis, L. delbrueckii bulgaricus, L. gasseri, L. helveticus, L. jensenii, L. mucosae, L. paracasei, L. plantarum, L. rhamnosus, L. silvarius* and *L. ruminis*.

In a further aspect, the present invention provides the novel bacterial strains DGCC11795, DGCC11864, DGCC11860, DGCC4299, DGCC11865, DGCC1753, DGCC5111, DGCC911, DGCC11887 and DGCC11881. These strains have been deposited by DuPont Nutrition Biosciences ApS under the Budapest Treaty on the International Recognition of the Deposit of Microorganisms for the purposes of Patent Procedure at Leibniz Institute DSMZ-German Collection of Microorganisms and Cell Cultures, Inhoffenstr. 7 B, D-38124 Braunschweig on 29 Jul. 2015 under accession numbers DSM 32101, DSM 32108, DSM 32107, DSM 32100, DSM 32109, DSM 32113, DSM 32103, DSM 32102, DSM 32097 and DSM 32115.

We hereby confirm that the depositor has authorised the applicant to refer to the deposited biological material in this application and has given his unreserved and irrevocable consent to the deposited material being made available to the public.

The invention further provides a mutant, a variant and/or a progeny of the deposited bacterial strains.

As used herein, the term "mutant" refers to any microorganism resulting from modification of the parent (i.e. deposited) strain. For example, a mutant may be a microorganism resulting from genetically modifying a deposited strain.

As used herein, the term "variant" refers to a naturally occurring microorganism which is derived from the parent (i.e. deposited strain). For example, a variant may be a microorganism resulting from adaption to particular cell culture conditions.

As used herein, the term "progeny" means any microorganism resulting from the reproduction or multiplication of any one of the deposited strains. Therefore, "progeny" means any direct descendant of any one of the deposited strains. As such, the progeny strain may itself be identified as the same strain as the parent (i.e. deposited) strain. It will be apparent to one skilled in the art that due to the process of asexual reproduction, a progeny strain will be genetically virtually identical to the parent strain. Accordingly, in one embodiment, the progeny may be genetically identical to the parent strain, and may be considered to be a "clone" of the parent strain. Alternatively, the progeny may be substantially genetically identical to the parent strain.

The mutant, variant or progeny may have at least 90, 95, 98, 99, 99.5 or 99.9% sequence identity over the entire length of the bacterial genome with their parent strain. Furthermore, the mutant, variant or progeny will retain the same phenotype as the deposited parent strain, for example the mutant, variant or progeny may demonstrate the same or equivalent level of in vitro vaginal cell adhesion and hydrogen peroxide production as the parent strain.

As used herein, the term "metabolite" refers to all molecules produced or modified by the bacteria as a result of bacterial metabolism during growth, survival, persistence, transit or existence of bacteria during probiotic product manufacture and storage and during gastrointestinal transit in a mammal. Examples include all organic acids, inorganic acids, bases, proteins and peptides, enzymes and co-enzymes, amino acids and nucleic acids, carbohydrates, lipids, glycoproteins, lipoproteins, glycolipids, vitamins, all bioactive compounds, metabolites containing an inorganic component, and all small molecules, for example nitrous molecules or molecules containing a sulphurous acid.

A metabolite or metabolites are typically obtained from the supernatant of a cell culture from which the bacterial cells have been removed. In one embodiment, the cells may be grown in MRS medium under anaerobic conditions for 6-24 hours at 37° C. According to a further embodiment, the bacterial cell culture may be grown to a cell density of at least about OD600 0.5, 1.0, 1.5, 2.0, 2.5, or 3.0, for example from 1.5 to 2.5 $OD_{600}$. The cells may suitably be removed by centrifugation or by filtration. It will be apparent that the supernatant may be used directly in the formulations of the present invention, or that one or more of the metabolites may be isolated from the supernatant by any suitable means prior to use.

Suitable metabolites for use in the present invention include, but are not limited to, metabolites from any of the above mentioned bacteria.

According to the present invention, the bacterium or metabolite thereof is characterised by its in vitro vaginal cell adhesion, with reference to a control strain. The adhesion may be measured by mixing the bacterium or metabolite thereof with the vaginal cells, and measuring adhesion according to any suitable test or assay. In one embodiment, the bacteria are labeled (for example, using a radioactive or fluorescent label) and applied to cultured human vaginal epithelial cells. Unattached bacteria are washed away and the label (e.g. radioactivity or fluorescence) for each sample is measured. In another embodiment, the bacteria are detected using suitable antibodies. In a further embodiment, the adhering bacteria are cultivated and identified. In a yet further embodiment, an affinity column may be used, if the receptor in the vaginal cell binding the bacteria is known.

According to one aspect of the invention, the vaginal cell adhesion is compared to *Lactobacillus helveticus* LH0138, which has an ATCC safe deposit number SD5587.

The claimed bacterium or metabolite is further characterized by its ability to produce $H_2O_2$ with reference to a control strain. $H_2O_2$ production may be measured by an suitable test or assay. In one embodiment, the strains is incubated in aeration for 3 h at 37° C. to induce the $H_2O_2$ production. A sample is taken from the aerated culture after 1.5 h and 3 h incubation and the presence of $H_2O_2$ in the sample is measured using a hydrogen peroxide fluorometric detection kit. In another embodiment, the strains are cultivated in tetramethylbenzine (TMB) agar containing horseradish peroxidase in aerobic conditions for several days. After exposure to ambient air, hydrogen peroxide producing colonies turn blue. (Rabe L K, Hillier S L. J Clin Microbiol 2003, 41 (7):3260-3264.). In further embodiments, $H_2O_2$ can be detected using Horseradish peroxidase-based fluorometric assay with Amplex Red, HRP-based spectrophotometric assay with 3,5,3'5'-tetramethylbenzidine, spectrophotometric assay based on ferrithiocyanate generation, or spectrophotometric assay based on the ferrous oxidation in the presence of xylenol orange (FOX) method.

The bacterium or metabolite thereof may further be selected on the basis of its resistance to bile and/or acid. These properties may be helpful to enable the bacterium or metabolite thereof to survive the conditions of the stomach and gastrointestinal tract, and are therefore advantageous properties for a probiotic bacterium.

Any suitable bile resistance assay may be used to determine average bile tolerance. In one embodiment, the bile resistance assay comprises incubating strain cultures in culture medium (e.g. MRS) containing a defined amount of dehydrated fresh bile (e.g. oxgall, available under the brand name Difco™ from BD), such as 0.9% or 0.3% at 37° C. for 24 hours in anaerobic conditions. Growth is measured before and after incubation and the bile tolerance results are expressed as % growth (OD) with bile in comparison to growth without bile.

Any suitable acid resistance assay may be used to determine average acid tolerance. In one embodiment, the acid tolerance assay comprises incubating bacterial cells in suitable medium (e.g. PBS) at neutral pH (i.e. pH 7.2) levels and at a comparator acidic pH (such as pH 2.5 or pH 3.5) for at least 90 min at 37° C. The ten-fold dilution series are grown on MRS agar, and colonies are counted after 48 h incubation in anaerobic conditions at 37° C. The results for acid tolerance are expressed as growth log reduction of CFU after exposure to acid conditions in comparison to neutral pH.

The invention further provides a probiotic composition comprising one or more bacterial strains that have been selected according to methods of the invention. The composition may comprise a single strain, or a combination of 2, 3, 4, 5, 6, 7, 8, 9 or 10 strains of the invention. The probiotic composition may further comprise additional strains, for example commercially available probiotic bacterial strains.

According to one embodiment, the probiotic composition of the invention further comprises one or more further bacterial strains.

In some embodiments the further micro-organism may be a bacterium from one or more of the following genera: *Lactococcus, Streptococcus, Pediococcus, Enterococcus, Leuconostoc, Carnobacterium, Propionibacterium, Bifidobacterium, Lactobacillus, Brevibacterium,* and *Vagococcus*. In one preferred embodiment the at least one further probiotic microorganism is selected from the genera *Lactobacillus, Streptococcus, Enterococcus, Bifidobacterium* and *Saccharomyces*.

In preferred embodiments, the further probiotic microorganism is a bacterium preferably a probiotic lactic acid bacterium and/or a probiotic *Bifidobacterium*. In one embodiment preferably the further microorganism is from the genus *Lactobacillus* or the genus *Bifidobacterium* or is a mixture thereof. Suitably, the microorganism may be a strain from the species *L. acidophilus, L. curvatus, L. rhamnosus, L. casei, L. paracasei, L. salivarius, B. lactis. B animalis, B. longum* and/or *B. bifidum*. In one embodiment, preferably the microorganism may be a strain from the species *L. acidophilus, L. curvatus, L. salivarius* and/or *B. lactis*.

The bifidobacterium may be any bifidobacterium having a probiotic effect, typically strains belonging to the species *Bifidobacterium animalis, Bifidobacterium breve, Bifidobacterium infantis, Bifidobacterium lactis, Bifidobacterium longum, Bifidobacterium bifidum* and *Bifidobacterium adolescentis* are used.

The *Lactobacillus* bacterium may be any of the following: *Lactobacillus acidophilus, Lactobacillis amylovorus. Lactobacillus bulgaricus, Lactobacillus casei, Lactobacillus delbrueckii, Lactobacillus fermentum, Lactobacillus gasseri, *Lactobacillus helveticus, Lactobacillus johnsonii, Lactobacillus lactis, Lactobacillus paracasei, Lactobacillus pentosaceus, Lactobacillus plantarum, Lactobacillus reuteri, Lactobacillus rhamnosus,* and *Lactobacillus salivarius,*

According to one embodiment, the probiotic composition of the invention further comprises one or more, such as a combination of 2, 3, 4 or 5 of the following commercially available strains: *Lactobacillus acidophilus* NCFM; *Bifidobacterium lactis* BL-04; *Lactobacillus paracasei* LPC37; *Bifidobacterium lactis* HNO19, and/or *Bifidobacterium lactis* Bi-07.

In one embodiment, the probiotic composition of the invention further comprises one or more strains such as *Lactobacillus acidophilus* NCFM, *Lactobacillus rhamnosus* HN001, *Bifidobacterium lactis* HNO19, *Bifidobacterium breve* Bb-03, *Bifidobacterium lactis* Bi-07, *Bifidobacterium lactis* B1-04, *Bifidobacterium longum* B1-05, *Lactobacillus acidophilus* La-14, *Lactobacillus bulgaricus* Lb-64, *Lactobacillus brevis* Lbr-35, *Lactobacillus casei* Lc-11, *Lactococcus lactis* L1-23, *Lactobacillus plantarum* Lp-115, *Lactobacillus paracasei* Lpc-37, *Lactobacillus rhamnosus* Lr-32, *Lactobacillus salivarius* Ls-33, *Streptococcus thermophilus* St-21, *Lactobacillus rhamnosus* GG, *Bifidobacterium lactis* Bb-12, *Lactobacillus rhamnosus* GR-1, *Lactobacillus reuteri* RC-14, *Lactobacillus rhamnosus* Rose11-11, *Lactobacillus helveticus* Rosen-52, *Lactobacifflus helveticus* LAFTI L10, *Lactobacillus casei* HA-108, *Lactobacillus rhamnosus* HA-111, *Lactobacillus brevis* HA-112, *Lactobacillus plantarum* HA-119, *Lactobacillus fermentum* HA-179 and *Lactobacillus reuteri* HA-188.

As used herein, the term "probiotic" refers to a live microorganism which, when administered in adequate amounts, confers a health benefit on the recipient. They are suitable for human consumption and therefore are non-pathogenic and non-toxic. These probiotic strains generally have the ability to survive the passage through the upper part of the digestive tract. Probiotic bacteria typically exercise their beneficial effect on health on the one hand via ecological interactions with the resident flora in the digestive tract, and on the other hand via their ability to influence the immune system in a positive manner via the "GALT" (gut-associated lymphoid tissue). Probiotic bacteria, when given in a sufficient number, have the ability to progress live through the intestine. However they do not cross the intestinal barrier and their primary effects are therefore induced in the lumen and/or the wall of the gastrointestinal tract. They then form part of the resident microbiota during the administration period. This colonization (or transient colonization) allows the probiotic bacteria to exercise a beneficial effect, such as the repression of potentially pathogenic micro-organisms present in the flora and interactions with the immune system of the intestine.

While there are no lower or upper limits for probiotic use, it has been suggested that at least $10^6$-$10^{12}$, such as at least $10^6$-$10^{10}$, for example $10^8$-$10^9$ CFU as a daily dose may be effective to achieve the desired health effects in a subject. Accordingly, the probiotic bacteria used in accordance with the present invention may comprise from $10^6$ to $10^{12}$ CFU of bacteria/g of support, and more particularly from $10^8$ to $10^{12}$ CFU of bacteria/g of support, typically $10^9$ to $10^{12}$ CFU/g for the lyophilized form.

Suitably, the bacterium may be administered at a dosage of from about $10^6$ to about $10^{12}$ CFU of microorganism/dose, typically about $10^8$ to about $10^{12}$ CFU of microorganism/dose. By the term "per dose" it is meant that this amount of microorganism is provided to a subject either per day or per intake, typically per day. For example, if the microorganism is to be administered in a food product (for example in a yoghurt)—then the yoghurt will typically contain from about $10^8$ to $10^{12}$ CFU of the microorganism. Alternatively, however, this amount of microorganism may be split into multiple administrations each consisting of a smaller amount of microbial loading — so long as the overall amount of microorganism received by the subject in any specific time (for instance each 24 hour period) is from about $10^6$ to about $10^{12}$ CFU of microorganism, such as about $10^8$ to about $10^{12}$ CFU of microorganism.

In accordance with the present invention an effective amount of at least one strain of a microorganism may be at least $10^6$ CFU of microorganism/dose, for example from about $10^6$ to about $10^{12}$ CFU of microorganism/dose, such as about $10^8$ to about $10^{12}$ CFU of microorganism/dose.

CFU stands for "colony-forming units". By 'support' is meant the food product, dietary supplement or the pharmaceutically acceptable support or carrier.

While it is possible to administer the bacterium or metabolite alone according to the present invention (i.e. without any support, diluent or excipient), they are typically administered on or in a carrier or support as part of a product, in particular as a component of a food product, a dietary supplement or a pharmaceutical formulation. These products typically contain additional components well known to those skilled in the art.

Any product which can benefit from the composition may be used in the present invention. These include but are not limited to foods, particularly fruit conserves and dairy foods and dairy food-derived products, and pharmaceutical products.

The bacterial composition of the present invention may be formulated as a nutritional supplement. The bacterial composition may be in the form of, for example, a capsule, tablet, powder or emulsion.

A typical probiotic ingredient is a freeze-dried powder containing, for example, $10^{19}$-$10^{12}$ viable probiotic bacterial cells per gram. The powder may further comprise a suitable carrier, such as skim milk or sugars, typically oligosaccharides such as sucrose or trehalose.

Alternatively, the bacterial composition may be encapsulated using a carrier such as alginate, starch or xanthan. A typical capsule preparation may contain approximately $10^9$-$10^{11}$ viable probiotic bacterial cells per capsule.

The probiotic composition of the present invention may additionally contain one or more prebiotics. The term "prebiotic component" as used herein refers to any compound, nutrient or additional microorganism used to support or enhance a desired probiotic health effect or to assist the growth and/or activity of probiotic bacteria. Typically, prebiotics are carbohydrates (such as oligosaccharides), but the definition does not preclude non-carbohydrates. The most prevalent forms of prebiotics are nutritionally classed as soluble fibre. To some extent, many forms of dietary fibre exhibit some level of prebiotic effect.

In one embodiment, a prebiotic is a selectively fermented ingredient that allows specific changes, both in the composition and/or activity in the gastrointestinal microflora that confers benefits upon host well-being and health.

Suitably, the prebiotic may be used according to the present invention in an amount of 0.01 to 100 g/day, such as 0.1 to 50 g/day, or 0.5 to 20 g/day. In one embodiment, the prebiotic may be used according to the present invention in an amount of 1 to 10 g/day, such as 2 to 9 g/day, or 3 to 8 g/day. In another embodiment, the prebiotic may be used according to the present invention in an amount of 5 to 50 g/day, such as 10 to 25 g/day.

Examples of dietary sources of prebiotics include soybeans, inulin sources (such as Jerusalem artichoke, jicama, and chicory root), raw oats, unrefined wheat, unrefined barley and yacon.

Examples of suitable prebiotics include alginate, xanthan, pectin, locust bean gum (LBG), inulin, guar gum, galacto-oligosaccharide (GOS), fructo-oligosaccharide (FOS), polydextrose (i.e. Litesse®), lactitol, lactosucrose, soybean oligosaccharides, isomaltulose (Palatinose™) isomalto-oligosaccharides, gluco-oligosaccharides, xylo-oligosaccharides, manno-oligosaccharides, beta-glucans, cellobiose, raffinose, gentiobiose, melibiose, xylobiose, cyclodextrins, isomaltose, trehalose, stachyose, panose, pullulan, verbascose, galactomannans, and all forms of resistant starches. A particularly preferred example of a prebiotic is polydextrose.

The probiotic composition of the present invention may be used as, or in the preparation of, a food product. Herein, the term "food" is used in a broad sense and covers food for humans as well as food for animals (i.e. a feed). In one aspect, the food is for human consumption.

The food may be in the form of a solution or as a solid—depending on the use and/or the mode of application and/or the mode of administration.

A typical probiotic food product may contain approximately $10^9$-$10^{11}$ viable probiotic bacterial cells per daily dose. The probiotic bacteria may be incorporated in the food product as a probiotic ingredient, such as a freeze-dried powder, or may be cultured in the product.

When used as or in the preparation of a food, such as functional food, the composition of the present invention may be used in conjunction with one or more of: a nutritionally acceptable carrier, a nutritionally acceptable diluent, a nutritionally acceptable excipient, a nutritionally acceptable adjuvant, and a nutritionally active ingredient.

By way of example, the probiotic composition of the present invention can be used as an ingredient in soft drinks, a fruit juice or a beverage comprising whey protein, health teas, cocoa drinks, milk drinks and lactic acid bacteria drinks, yoghurt and drinking yoghurt, cheese, ice cream, water ices and desserts, confectionery, biscuits cakes and cake mixes, snack foods, balanced foods and drinks, fruit fillings, care glaze, chocolate bakery filling, cheese cake flavoured filling, fruit flavoured cake filling, cake and doughnut icing, instant bakery filling creams, fillings for cookies, ready-to-use bakery filling, reduced calorie filling, adult nutritional beverage, acidified soy/juice beverage, aseptic/retorted chocolate drink, bar mixes, beverage powders, calcium fortified soy/plain and chocolate milk, calcium fortified coffee beverage.

The probiotic composition can further be used as an ingredient in food products such as American cheese sauce, anti-caking agent for grated & shredded cheese, chip dip, cream cheese, dry blended whip topping fat free sour cream, freeze/thaw dairy whipping cream, freeze/thaw stable whipped topping, low fat and light natural cheddar cheese, low fat Swiss style yoghurt, aerated frozen desserts, hard pack ice cream, label friendly, improved economics & indulgence of hard pack ice cream, low fat ice cream: soft serve, barbecue sauce, cheese dip sauce, cottage cheese dressing, dry mix Alfredo sauce, mix cheese sauce, dry mix tomato sauce and others.

The term "dairy product" as used herein is meant to include a medium comprising milk of animal and/or vegetable origin. As milk of animal origin there can be mentioned cow's, sheep's, goat's or buffalo's milk. As milk of vegetable origin there can be mentioned any fermentable substance of vegetable origin which can be used according to the invention, in particular originating from soybeans, rice or cereals.

According to one particular aspect, the food product employed according to the invention is a fermented milk or humanized milk.

For certain aspects, the present invention may be used in connection with fermented dairy and non-dairy products such as yoghurt production, fermented yoghurt drink, yoghurt, drinking yoghurt, cheese, fermented cream, milk based desserts and others.

Suitably, the composition can be further used as an ingredient in one or more of cheese applications, meat applications, or applications comprising protective cultures.

The present invention also provides a method of preparing a food or a food ingredient, the method comprising admixing the composition according to the present invention with another food ingredient.

Advantageously, the present invention relates to products that have been contacted with the probiotic composition of the present invention (and optionally with other components/ingredients), wherein the composition is used in an amount to be capable of improving the nutrition and/or health benefits of the product.

As used herein the term "contacted" refers to the indirect or direct application of the composition of the present invention to the product. Examples of the application methods which may be used, include, but are not limited to, treating the product in a material comprising the composition, direct application by mixing the composition with the product, spraying the composition onto the product surface or dipping the product into a preparation of the composition.

Where the product of the invention is a foodstuff, the composition of the present invention is typically admixed with the product. Alternatively, the composition may be included in the emulsion or raw ingredients of a foodstuff. In a further alternative, the composition may be applied as a seasoning, glaze, colorant mixture, and the like.

For some applications, it is important that the composition is made available on or to the surface of a product to be affected/treated. This allows the composition to impart one or more of the following favourable characteristics: nutrition and/or health benefits.

The compositions of the present invention may be applied to intersperse, coat and/or impregnate a product with a controlled amount of a microorganism.

In one embodiment, the composition is used to ferment milk or sucrose fortified milk or lactic media with sucrose and/or maltose where the resulting media containing all components of the composition—i.e. said microorganism according to the present invention—can be added as an ingredient to yoghurt milk in suitable concentrations—such as for example in concentrations in the final product which offer a daily dose of $10^6$-$10^{10}$ cfu. The microorganism according to the present invention may be used before or after fermentation of the yoghurt.

Advantageously, where the product is a food product, the probiotic bacteria should remain effective through the normal "sell-by" or "expiration" date during which the food product is offered for sale by the retailer. The effective time may usefully extend past such dates until the end of the normal freshness period when food spoilage becomes apparent. The desired lengths of time and normal shelf life will vary from foodstuff to foodstuff and those of ordinary skill in the art will recognise that shelf-life times will vary upon the type of foodstuff, the size of the foodstuff, storage temperatures, processing conditions, packaging material and packaging equipment.

The probiotic composition of the present invention may be used as, or may be added to, a functional food. As used herein, the term "functional food" means food which is capable of providing not only a nutritional effect and/or a taste, but is also capable of delivering a further beneficial effect to consumer, such as an additional health benefit.

Accordingly, functional foods are ordinary foods that have components or ingredients (such as those described herein) incorporated into them that impart to the food a specific functional benefit, such as a medical or physiological benefit, other than a purely nutritional effect. Although there is no legal definition of a functional food, they are generally foods marketed as having specific health effects.

Some functional foods are nutraceuticals. As used herein, the term "nutraceutical" means a food which is capable of providing not only a nutritional effect and/or a taste satisfaction, but is also capable of delivering a therapeutic (or other beneficial) effect to the consumer. Nutraceuticals cross the traditional dividing lines between foods and medicine.

According to a further aspect, the present invention relates to the use of a bacterium or metabolite thereof which demonstrates binding to vaginal cell adhesion and hydrogen peroxide production, or a probiotic composition comprising one or more such bacteria, for the prevention and/or treatment of urogenital disorders.

As used herein, the term "urogenital disorder" includes any disease or disorder relating to the reproductive organs or the urinary system, in particular urogenital infections. The disorder may be one that is known to be associated with an altered composition and/or diversity of the urogenital microbiota. The urogenital disorder may be a urinary tract infection (e.g. infection by *E. coli, Enterococcus faecalis* or *Staphylococcus saprophyticus*), bacterial vaginosis (e.g. infection with anaerobic bacteria such as *Gardnerella vaginalis*) or yeast vaginitis (e.g. infection by yeast such as *Candida albicans, Candida glabrata, Candida krusei* and/or *Candida tropicalis*).

In another aspect of the invention, the claimed bacterium, metabolite thereof or probiotic composition may additionally be used in the treatment of a gastrointestinal disorder.

As used herein, the term "gastrointestinal disorder" includes any disease or disorder relating to the gastrointestinal tract. The disorder may, for example, be one that is known to be associated with an altered composition and diversity of the GIT microbiota. The gastrointestinal disorder may be inflammatory bowel disease (IBD), irritable bowel syndrome (IBS), Crohn's disease, ulcerative colitis, constipation or diarrhoea.

When used as—or in the preparation of—a pharmaceutical, the composition of the present invention may be used in conjunction with one or more of: a pharmaceutically acceptable carrier, a pharmaceutically acceptable diluent, a pharmaceutically acceptable excipient, a pharmaceutically acceptable adjuvant, a pharmaceutically active ingredient.

A pharmaceutically acceptable support may be for example a support in the form of compressed tablets, tablets, capsules, ointments, suppositories or drinkable solutions. Other suitable forms are provided below.

The pharmaceutical may be in the form of a solution or as a solid—depending on the use and/or the mode of application and/or the mode of administration.

The bacterium or metabolite thereof or probiotic composition may be used according to the present invention in any suitable form—whether when alone or when present in a combination with other components or ingredients. The bacteria used in the present invention may be referred to herein as "the composition". Likewise, combinations comprising the composition of the present invention and other components and/or ingredients (i.e. ingredients—such as food ingredients, functional food ingredients or pharmaceutical ingredients) may be used in any suitable form.

The bacterium or metabolite thereof or probiotic composition may be used according to the present invention in the form of solid or liquid preparations or alternatives thereof. Examples of solid preparations include, but are not limited to tablets, capsules, dusts, granules and powders which may be wettable, spray-dried or freeze-dried. Examples of liquid preparations include, but are not limited to, aqueous, organic or aqueous-organic solutions, suspensions and emulsions.

Suitable examples of forms include one or more of: tablets, pills, capsules, ovules, solutions or suspensions, which may contain flavouring or colouring agents, for immediate-, delayed-, modified-, sustained-, pulsed- or controlled-release applications.

By way of example, if the composition of the present invention is used in a tablet form—such for use as a functional ingredient—the tablets may also contain one or more of: excipients such as microcrystalline cellulose, lactose, sodium citrate, calcium carbonate, dibasic calcium phosphate and glycine; disintegrants such as starch (such as corn, potato or tapioca starch), sodium starch glycollate, croscarmellose sodium and certain complex silicates; granulation binders such as polyvinylpyrrolidone, hydroxypropylmethylcellulose (HPMC), hydroxypropylcellulose (HPC), sucrose, gelatin and acacia; lubricating agents such as magnesium stearate, stearic acid, glyceryl behenate and talc may be included.

Examples of nutritionally acceptable carriers for use in preparing the forms include, for example, water, salt solutions, alcohol, silicone, waxes, petroleum jelly, vegetable oils, polyethylene glycols, propylene glycol, liposomes, sugars, gelatin, lactose, amylose, magnesium stearate, talc, surfactants, silicic acid, viscous paraffin, perfume oil, fatty acid monoglycerides and diglycerides, petroethral fatty acid esters, hydroxymethylcellulose, polyvinylpyrrolidone, and the like.

Suitable excipients for the forms include lactose, starch, a cellulose, milk sugar or high molecular weight polyethylene glycols.

For aqueous suspensions and/or elixirs, the composition of the present invention may be combined with various sweetening or flavouring agents, colouring matter or dyes, with emulsifying and/or suspending agents and with diluents such as water, propylene glycol and glycerin, and combinations thereof.

The forms may also include gelatin capsules, fibre capsules, fibre tablets or fibre beverages.

It will be apparent to the skilled person that a formulation for oral administration should ideally be able to remain stable during transit though the gastrointestinal tract; for example, it may be resistant to proteolytic degradation, stable at acid pH and resistant to the detergent effects of bile.

Alternatively, the bacterium or metabolite thereof or probiotic composition may be formulated for transmucosal administration, for example via the intravaginal or rectal route. The formulation may be a cream, tablet, pessary or suppository.

The invention further provides the following disclosure, presented in the form of numbered paragraphs:

1. A bacterium or metabolite thereof characterised by:
   a) a binding affinity in an assay for in vitro vaginal cell adhesion to of at least 1.0 when compared to *Lactobacillus helveticus* LH0138; and
   b) a hydrogen peroxide production level of more than 1128581 measured as fluorescence counts produced during 1.5 hours when determined in a hydrogen peroxide production assay herein and/or a level higher than that of *Lactobacillus reuteri* RC-14.

2. A bacterium or metabolite thereof according to paragraph 1 wherein said bacterium or metabolite thereof is further characterised by:
   c) more than −2.6 average acid tolerance represented as a log change when measured at pH 2.5 for 1.5 hours as defined in an acid resistance assay; and/or
   d) more than 40% average bile tolerance represented as growth in 0.9% dehydrated fresh bile as a percentage of growth in MRS without bile as defined in a bile resistance assay.

3. A bacterium according to paragraph 1 or 2 wherein said bacterium is deposited as DSM 32101, DSM 32108, DSM 32107, DSM 32100, DSM32109, DSM 32113, DSM 32103, DSM 32102, DSM 32097, DSM 32115 or a mutant, variant and/or progeny thereof.

4. A probiotic composition comprising a bacterium or metabolite thereof according to any one of paragraphs 1 to 3.

5. A probiotic composition according to paragraph 4, which further comprises a suitable carrier.

6. A probiotic composition according to paragraph 4 or 5, which comprises a combination of 2, 3, 4, 5 or 6 bacterial strains or metabolites thereof as defined in any one of paragraphs 1 to 3.

7. A probiotic composition according to any of the paragraphs 4 to 6 wherein the composition further comprises one or more further bacterial strains.

8. A probiotic composition according to paragraph 7, wherein said one or more further bacterial strains are selected from: *Lactobacillus acidophilus* NCFM; *Bifidobacterium lactis* BL-04; *Lactobacillus paracasei* LPC37; *Bifidobacterium lactis* HNO19, and/or *Bifidobacterium lactis* Bi-07.

9. A probiotic composition according to paragraph 8 comprising DSM32109, *Lactobacillus acidophilus* NCFM, *Bifidobacterium lactis* BL-04, *Lactobacillus paracasei* LPC37, *Bifidobacterium lactis* HNO19 and *Bifidobacterium lactis* Bi-07.

10. A probiotic composition according to any one of paragraphs 4 to 9, which further comprises at least one prebiotic component.

11. A method of producing a probiotic composition according to any one of paragraphs 4 to 10, the method comprising combining the selected bacterium or metabolite thereof with a suitable carrier.

12. A food product, dietary supplement, medical food, neutraceutical or pharmaceutical composition comprising a probiotic composition according to any one of paragraphs 4 to 10.

13. A method of selecting a bacterium or metabolite thereof comprising:
   a) assaying vaginal cell adhesion using a method comprising:
      i) growing one or more test bacteria;
      ii) growing a control culture of *Lactobacillus helveticus* LH0138;
      iii) incubating the one or more test bacteria and the control culture of *Lactobacillus helveticus* LH0138 with one or more vaginal epithelial cells;
      iv) measuring the adhesion of the test bacteria and control to the one or more vaginal epithelial cells; and
   b) assaying hydrogen peroxide production using a method comprising:
      i) growing one or more test bacteria;
      ii) growing a *Lactobacillus reuteri* RC-14 control culture;
      iii) incubating the one or more test bacteria and the control culture for the same period of time;
      iv) measuring the hydrogen peroxide production in the one or more test bacteria and the control(s); and
   c) selecting bacteria which adhere to the one or more vaginal epithelial cells with an affinity of at least 100% when compared to the *Lactobacillus helveticus* LH0138 control culture and which produce more hydrogen peroxide than the *Lactobacillus reuteri* RC-14 control culture.

14. A method according to paragraph 13 wherein the incubation test bacteria and controls in steps a) iii) and b) iii) are incubated in separate vials.

15. A method according to paragraph 13 or 14 wherein said method further comprises:
   d) assaying the average acid tolerance of the bacteria selected in step c) at pH 2.5 for 1.5 hours; and/or
   e) assaying the average bile tolerance of the bacteria selected in step c) in 0.9% bile; and
   f) selecting one or more bacteria having more than −2.6 average acid tolerance represented as a log change when measured at pH 2.5 for 1.5 hours and/or more than 40% average bile tolerance represented as growth in 0.9% bile as a percentage of growth in MRS without bile.

16. A bacterium or metabolite thereof selected by the method of any one of paragraphs 13-15.

17. Use of a bacterium or metabolite according to any one of paragraphs 1-3 or 16 or selected by the method of any one of paragraphs 13-15, or a probiotic composition according to any one of paragraphs 4-10, for the manufacture of a formulation for preventing and/or treating urogenital disorders.

18. A bacterium or metabolite according to any one of paragraphs 1-3 or 16 or selected by the method of any one of paragraphs 13-15, or a probiotic composition according to any one of paragraphs 4-10, for use in preventing and/or treating urogenital disorders.

19. A use or a bacterium or metabolite for use according to paragraph 17 or 18 wherein said use is further for preventing and/or treating gastrointestinal disorders.

20. A method of preventing and/or treating urogenital disorders comprising administering to a subject a bacterium or metabolite thereof according to any one of paragraphs 1-3 or 16 or selected by the method of any one of paragraphs 13-15, or a probiotic composition according to any one of paragraphs 4-10, in a pharmaceutically effective amount.

21. A method according to paragraph 20, wherein said method is further for preventing and/or treating gastrointestinal disorders.

22. A bacterium, metabolite, probiotic composition, food product, method, bacterium or metabolite for use, use or combinations thereof substantially as described herein with reference to the drawings.

The invention will now be described, by way of example only, with reference to the following Examples.

EXAMPLES

Materials & Methods
Probiotic Properties of the Strains

Acid tolerance of the strains was tested in pH 2.5 and pH 3.5 for 1.5 h and bile tolerance in 0.9% and 0.3% Oxgall (Difco) bile concentrations for 24 h (Saarela et al. 2009). Briefly, the strains were cultivated in duplicate in MRS broth in anaerobic conditions at 37° C. for 18 h. The pelleted cells were washed twice with 10 ml PBS pH 7.2 and resuspended in 0.01 mol/L PBS pH 7.2 so that the optical density ($OD_{600}$) of the sample was 1 (equals to $1\times10^8$ CFU/ml). Acid tolerance was tested by incubating cells in PBS pH 7.2. PBS pH 2.5 and PBS pH 3.5 for 90 min at 37° C. The ten-fold dilution series were grown on MRS agar, and colonies were counted after 48 h incubation in anaerobic conditions at 37° C. The results for acid tolerance were expressed as growth log reduction of CFU after exposure to pH 2.5 or 3.5 in comparison to pH 7.2. Bile tolerance was tested by incubating 1:10 diluted strain cultures in MRS containing 0.9% Oxgall, MRS containing 0.3% Oxgall and in plain MRS at 37° C. for 24 in anaerobic conditions. The growth was measured before and after incubation as $OD_{595}$ by Multiskan RC (Labsystems). The bile tolerance results were expressed as % growth (OD) in MRS with 0.9% or 0.3% Oxgall in comparison to growth (OD) in MRS without bile. Additionally, acid and bile tolerance of strains was compared with that of *Lactobacillus rhamnosus* LGG (VTT E-96666) strain. All the measurements were performed in duplicates and repeated twice for most of the strains.

$H_2O_2$ Production

Capability of strains to produce $H_2O_2$ was tested as a potential mechanism for pathogen inhibition. *Lactobacillus reuteri* RC-14 was included as a control strain in each experiment. The stains were cultivated in microaerophilic conditions in MRS at 37° C. for overnight. The $OD_{600}$ after overnight cultivation was measured by Multiskan RC (Labsystems) and was in average 2.2 (from 1.8 to 2.4). For the $H_2O_2$ assay, 1 ml of the culture was inoculated in 10 ml MRS broth and incubated in aeration for 3 h at 37° C. to induce the $H_2O_2$ production. The 50 µl sample was taken from the aerated culture in the beginning of the incubation (=0 h), and after 1.5 h and 3 h incubation. The presence of $H_2O_2$ in the 50 µl sample was measured by hydrogen peroxide fluorometric detection kit (Enzo Life Sciences) according to the manufacturer's instructions. Briefly, the 50 µl reaction cocktail was added into 50 µl sample, incubated for 10 min in dark at room temperature, and the fluorescence was measured by Wallac Viktor² 1420 multilabel counter (Perkin Elmer). The results were expressed as $H_2O_2$ produced during 3 hours.

Ex Vivo Adhesion on Vaginal Epithelial Cells

Primary vaginal cells isolated from healthy donors (age not specified) originated from CelProgen (San Pedro. Calif. USA). The cells were expanded in Human Vaginal Epithelial Expansion ECM t75 flasks (CelProgen) in Human Vaginal Epithelial Cell Growth Media with Serum (CelProgen). The cells were used in the adhesion assays at the earliest passage possible. The cells were cultivated at 37° C. with 5% $CO_2$ atmosphere.

Preparation of bacterial cells for adhesion assay: The bacterial strains were grown over night under appropriate growth medium (see Table 1 for pathogens). DAVE strains were cultivated in MRS) under anaerobic conditions at 37° C. The bacteria were labeled radioactively by culturing them over night anaerobically 37° C. in 1.5 ml appropriate media to which 10 µl of methyl-1.2 [3H]Thymidine (4.4 TBq/mmol) (Perkin Elmer) was added. The following day the bacteria were collected by centrifugation at 2800×g for 5 min. and the bacterial pellet was suspended in PBS (Life Technologies) and washed twice with PBS. The bacterial quantity was determined with flow cytometry as described by Apajalahti et al. 2002. After counting, bacterial cell number corresponding to 10 bacteria per one vaginal cell was centrifuged and diluted to DMEM.

Adhesion assay: For the adhesion assays 150 000 vaginal epithelial cells were seeded in Human Vaginal Epithelial Cell Culture ECM 24-well plates (CelProgen). After o/n incubation the cells were washed 2 times with DM EM (Life Technologies) without any supplements, and labelled bacteria were applied on the cells and incubated for 1 hour. Unattached bacteria were washed away by washing 4 times with PBS (Life Technologies), after which 100 µl of DMEM and 1 ml of Optiphase supermix (Perkin Elmer) was pipetted on the cells. For each assay following controls were included:

control 1: control wells with cells but no bacteria
control 2: control wells in which the same amount of bacteria were included but no cells. This represents the maximum number of radioactive counts that can be obtained from a sample.
control 3: wells without bacteria or cells The radioactivity was counted using 1450 Microbeta Trilux Liquid Scintillation and Luminescence counter (Perkin Elmer). The adhesion for each bacteria was calculated as follows:

$$\% \text{ Adhesion} = \frac{\text{Sample value} - \text{control 1}}{\text{control 2} - \text{control 3}} \times 100$$

The adhesion of each bacteria was compared to the adhesion of the control strain *Lactobacillus helveticus* LH0138, which has a ATCC safe deposit number SD5587. The binding affinity of the control is represented as 100% or as 1.0 and the binding affinity of the test strains compared thereto. For the % adhesion this was accomplished by dividing the sample % Adhesion with the mean % Adhesion value of the control strain.

Pathogen Growth Prevention

The capability of test strains to prevent the growth of pathogens *Gardnerella vaginalis* CCUG 3717T, CCUG 44114, CCUG 44157, CCUG 44159, *Atopobium vaginae* CCUG 38953T, CCUG 39382, CCUG 44156, *Prevotella bivia* CCUG 9557T, CCUG 34043 and CCUG 56865 was tested. For the growth prevention tests, test strains were cultured in GEM medium (Saarela et al. 2004) supplemented with 1% glucose and pathogen were cultured in GEM supplemented with 10% horse serum. Both pathogens and test strains were grown anaerobically in 37° C. for 48 h. Each test strain and pathogen pair was tested by inoculating 100 µl GEM media with 10% horse serum with 100 µl of studied pathogen and adding 100 µl of the 0.22 um filtered supernatants of GEM-grown test strain. The OD of each test-pathogen pair was measured before and after 48 h aerobic incubation at 37° C. by Bioscreen (Growth Curves Ltd.). Each Biocreen incubation and measurement was done in two replicates and each experiment control strain *L. rhamnosus* GG was tested in addition to test strains and negative control (300 µl GEM media with 10% horse serum without any bacteria) and positive growth controls for each pathogen (100 µl pathogen in 200 µl GEM media with 10% horse serum). The OD difference before and after the Bioscreen incubation, was calculated and related to the growth of pathogen without DAVE strains. The pathogens, *G. vaginalis* CCUG 44157, *A. vaginae* CCUG 39382 and all *P. bivia* strains grew poorly on GEM-media supplemented with 10% horse serum. Therefore growth prevention capability of DAVE strains could not be studied with these pathogens.

Pathogen Adhesion Exclusion on Vaginal Cell Lines

The pathogen adhesion exclusion was studied with primary vaginal epithelial cells obtained from Celprogen (cat. No. 36078-11). The pathogen adhesion exclusion was screened with four pathogens (Table 1):

TABLE 1

Pathogens used in pathogen adhesion exclusion assays

| Genus ID (16S) | Collection | Strain ID |
|---|---|---|
| *Escherichia coli* | CCGU | 44113 |
| *Prevotella bivia* | CCGU | 9557T |
| *Prevotella bivia* | CCGU | 56865 |
| *Atopobium vaginae* | CCGU | 44156 |

For pathogen adhesion exclusion assays the pathogens were labeled, and the *lactobacillus* used to prevent the adhesion was unlabeled. So, in contrary to *lactobacillus* adhesion assays, the lower the counts were, the better the adhesion prevention was. The pathogen adhesion exclusion assay was repeated 3 times with 3-4 replicates.

Adhesion exclusion procedure: Vaginal cells were washed twice with DMEM without supplements, and lactobacilli were administered on top of the cells as amount of 10 bacterial cells towards one vaginal cell. The lactobacilli were allowed to attach to the vaginal cells for 1 hour, after which unattached bacteria were washed away by 3 times with DMEM. After the washings pathogens were applied on top of the cells in a 10:1 ratio, and allowed to attach for 1 hour. (Exception: for experiment 3 instead of 10 pathogen bacteria/1 vaginal epithelial cell. 20 bacteria/1 vaginal epithelial cell was used. This applied only for the pathogens and the amount of lactobacilli was the same in experiment 3 as in other experiments.) The unbound bacteria were washed with PBS for four times, 100 µl DMEM as well as 1 ml of Optiphase Supermix was pipetted on top of the cells, and counted using 1450 Microbeta Trilux Liquid Scintillation and Luminescence counter. The value for attachment was calculated similarly as in section 4.5, except that the % Adhesion values were normalized against a control cells which were incubated only with pathogens but not with lactobacilli.

Measurement of SCFA from the Microbial Culture Media

The production of short-chain fatty acids and lactic acid was analyzed for the 25 strain sub set. The strains were cultivated in GEM media in aerobic conditions for 2 days. The short-chain fatty acids and lactic acid contents of the microbial culture media were determined by gas chromatography as follows: One ml of an internal standard (20 mM pivalic acid), 3 ml of water and 2.5 ml of saturated oxalic acid solution were added to 1 ml of the sample. After thorough mixing, the sample was allowed to stand at 4° C. for 60 min, before centrifuged at 16000×g for 5 min. One ml of the supernatant was analyzed by gas chromatography using a glass column packed with 80/120 Carbopack B-DA/ 4% Carbowax 20 M stationary phase (Supelco. Bellefonte Pa. USA) at 175° C. and helium as the carrier gas at flow rate of 24 ml/min. The temperature of the injector and the flame ionisation detector was 200° C. and 245° C., respectively. The concentrations of acetic acid, propionic acid, butyric acid, isobutyric acid, valeric acid, isovaleric acid, 2-methylbutyric acid and lactic acid were determined.

Example 1

A number of different criteria were used to select bacteria of the invention that would have advantageous properties compared to control strains for a probiotic composition designed to improve urogenital health.

The criteria used and the cut-off values selected are indicated below in Table 2.

TABLE 2

Cut-off values for selection

| Selected criteria | Control strain | Cut-off value | Results |
|---|---|---|---|
| Acid pH 2.5 | *L. Rhamnosus* LGG | −2.6 | Average acid tolerance, log change in pH 2.5 for 1.5 h |
| Bile 0.9 % | *L. Rhamnosus* LGG | 40% | Average bile tolerance, growth in 0.9% oxgall as % of growth in MRS w/o bile |
| $H_2O_2$ | RC-14 (Chr. Hansen) | 1128581 | $H_2O_2$ production 1.5 h with background |
| Adhesion to vaginal cells | *Lactobacillus helveticus* LH0138 | 1.0 | In vitro vaginal cell adhesion |

The assays were carried out as indicated above in the Materials and Methods section. The results of these analyses are presented below for a number of strains.

TABLE 3

Results of the vaginal cell adhesion studies.

| Deposit number(s) | DGCC strain number | Other strain code/ commercial ID | Identification | In vitro vaginal cell adhesion |
|---|---|---|---|---|
| DSM 22193, SD 5217 | 9913 | Lr-32 | *L. rhamnosus* | −0.46 |
| SD5209, PTA-4799, DSM 22266 | 4715 | LP0115 | *L. paracasei* | −0.14 |
| PTA-4800 | 9868 | LS-33 | *L. salivarius* | 0.08 |
| DSM 32363 | 4022 | LA0893 | *L. acidophilus* | 0.08 |
| DSM22091, SD5221, PTA-4797 | 8698 | NCFM | *L. acidophilus* | 0.10 |
| SD 5213 | 9864 | Lc-11 | *L. casei* | 0.21 |
| SD 5589 | 4106 | LB0064 | *L. delbrueckii bulgaricus* | 0.25 |
| SD 5585 | 10687 | LG10687/LG-36 | *L. gasseri* | 0.34 |
| SD 5212 | 9353 | La-11/La-14 | *L. acidophilus* | 0.50 |

TABLE 3-continued

Results of the vaginal cell adhesion studies.

| Deposit number(s) | DGCC strain number | Other strain code/ commercial ID | Identification | In vitro vaginal cell adhesion |
|---|---|---|---|---|
| PTA-4798 | 4981 | LQ0281/LPC-37 | L. paracasei | 0.57 |
| SD 5584 | 8656 | M61/LI-23 | Lactococcus lactis LI-23 | 0.59 |
| DSM 22876, SD 5675 | 1460 | 1460/HN001 | L. rhamnosus | 0.82 |
| SD 5587 | 4451 | LHO138 | L. helveticus | 1.02 |
| SD 5214 | 9912 | LBr-35 | L. brevis | 1.34 |
| DSM 32101 | 11795 | Lj34-A | L. jensenii | 1.49 |
| DSM 32109 | 11865 | LX11865 | L. fermentum | 1.72 |
| DSM 32100 | 4299 | LX1220 | L. crispatus | 1.75 |
| DSM 32103 | 5111 | LG0179 | L. gasseri | 1.81 |
| DSM 32115 | 11881 | LX11881 | L. rhamnosus | 2.08 |
| DSM 32102 | 911 | 911 | L. jensenii | 2.27 |
| DSM 32113 | 1753 | 1753 | L. fermentum | 2.42 |
| DSM 32107 | 11860 | LX11860 | L. brevis | 2.95 |
| DSM 32108 | 11864 | LX11864 | L. brevis | 3.83 |
| DSM 32097 | 11887 | LX11887 | L. paracasei | 4.07 |

TABLE 4

Results of the $H_2O_2$ production studies.

| Deposit number(s) | DGCC strain number | Other strain code/ commercial ID | Identification | $H_2O_2$ production 1.5 h with background | $H_2O_2$ production 3.0 h with background |
|---|---|---|---|---|---|
| SD 5275, PTA-4799, DSM 22266 | 4715 | LP0115 | L. plantarum | 282647 | 285930 |
| PTA-4800 | 9868 | LS-33 | L. salivarius | 655327 | 333825 |
| SD 5214 | 9912 | LBr-35 | L. brevis | 271934 | 339382 |
| DSM 32107 | 11860 | LX11860 | L. brevis | 264719 | 375573 |
| SD 5213 | 9864 | Lc-11 | L. casei | 367895 | 558380 |
| PTA-4798 | 4981 | LQ0281/LPC-37 | L. paracasei | 471449 | 567818 |
| DSM 22193, SD 5217 | 9913 | Lr-32 | L. rhamnosus | 733715 | 1027230 |
| DSM 22876, SD 5675 | 1460 | 1460/HN001 | L. rhamnosus | 734885 | 2005442 |
| SD 5585 | 10687 | LG10687/LG-36 | L. gasseri | 1770088 | 2042328 |
| | | RC-14 | | 1128581 | 2428334 |
| DSM 32115 | 11881 | LX11881 | L. rhamnosus | 1588617 | 2796718 |
| DSM 32108 | 11864 | LX11864 | L. brevis | 1854440 | 3112013 |
| DSM 32113 | 1753 | 1753 | L. fermentum | 6676738 | 3947893 |
| DSM 22091, SD5221, PTA-4797 | 8698 | NCFM | L. acidophilus | 2112559 | 4224538 |
| DSM 32363 | 4022 | LA0893 | L. acidophilus | 3586960 | 4546831 |
| DSM 32097 | 11887 | LX11887 | L. paracasei | 499048 | 506964 |
| | | GR-1 | | 4972576 | 5603194 |
| SD 5212 | 9353 | La-11/La-14 | L. acidophilus | 2883017 | 5716671 |
| DSM 20557 | | | L. Jensenii | 6074371 | 6014675 |
| DSM 32101 | 11795 | Lj34-A | L. jensenii | 6485794 | 6063696 |
| DSM 32100 | 4299 | LX1220 | L. crispatus | 7065110 | 6177153 |
| DSM 32103 | 5111 | LG0179 | L. gasseri | 5106585 | 6444029 |
| SD 5589 | 4106 | LB0064 | L. delbrueckii bulgaricus | 5799894 | 7147321 |
| DSM 32109 | 11865 | LX11865 | L. fermentum | 6214442 | 7326049 |
| SD 5584 | 8656 | M61/LI-23 | Lactococcus lactis LI-23 | 6247743 | 8153363 |
| DSM 32102 | 911 | 911 | L. jensenii | 8380179 | 8427834 |

TABLE 5

Results of the acid tolerance studies at pH 2.5 for 1.5 hours.

| Deposit number(s) | DGCC strain number | Other strain code/ commercial ID | Identification | Acid tolerance, log change in pH 2.5 for 1.5 h | Acid tolerance, log change in pH 2.5 for 1.5 h | Average acid tolerance, log change in pH 2.5 for 1.5 h |
|---|---|---|---|---|---|---|
| DSM 32101 | 11795 | Lj34-A | L. jensenii | −5.5 | −5.0 | −5.3 |
| DSM 32107 | 11860 | LX11860 | L. brevis | −5.2 | | −5.2 |
| DSM 32363 | 4022 | LA0893 | L. acidophilus | −5.7 | −4.3 | −5.0 |
| PTA-4800 | 9868 | LS-33 | L. salivarius | −4.6 | −4.8 | −4.7 |
| DSM32109 | 11865 | LX11865 | L. fermentum | −4.3 | −5.1 | −4.7 |
| DSM 32108 | 11864 | LX11864 | L. brevis | −5.4 | −3.5 | −4.5 |
| DSM 32102 | 911 | 911 | L. jensenii | −3.7 | −4.7 | −4.2 |
| SD 5584 | 8656 | M61/LI-23 | Lactococcus lactis LI-23 | −4.3 | −4.1 | −4.2 |
| SD 5214 | 9912 | LBr-35 | L. brevis | −4.1 | −3.2 | −3.7 |
| DSM 32100 | 4299 | LX1220 | L. crispatus | −2.5 | −3.8 | −3.2 |
| SD 5275, PTA-4799, DSM 22266 | 4715 | LP0115 | L. plantarum | −3.1 | −2.9 | −3.0 |
| SD 5589 | 4106 | LB0064 | L. delbrueckil bulgaricus | −3.2 | −2.4 | −2.8 |
| SD 5212 | 9353 | La-11/La-14 | L. acidophilus | −4.2 | −1.2 | −2.7 |
| | | | L. rhamnosus LGG | | | −2.6 |
| PTA-4798 | 4981 | LQ0281/LPC-37 | L. paracasei | −2.6 | −2.5 | −2.5 |
| DSM 22193, SD 5217 | 9913 | Lr-32 | L. rhamnosus | −2.1 | −2.4 | −2.2 |
| DSM 22091, SD5221, PTA-4797 | 8698 | NCFM | L. acidophilus | −1.3 | −3.2 | −2.2 |
| DSM 22876, SD 5675 | 1460 | 1460/HN001 | L. rhamnosus | −2.2 | −2.2 | −2.2 |
| DSM 32115 | 11881 | LX11881 | L. rhamnosus | −1.5 | −2.6 | −2.0 |
| DSM 32097 | 11887 | LX11887 | L. paracasei | −1.1 | −1.6 | −1.3 |
| DSM 32103 | 5111 | LG0179 | L. gasseri | −0.6 | −1.2 | −0.9 |
| DSM 32113 | 1753 | 1753 | L. fermentum | −0.2 | −0.6 | −0.4 |
| SD 5585 | 10687 | LG10687/LG-36 | L. gasseri | 0.1 | −0.1 | 0.0 |

TABLE 6

Results of the acid tolerance studies at pH 3.5 for 1.5 hours.

| Deposit number(s) | DGCC strain number | Other strain code/ commercial ID | Identification | Acid tolerance, log change in pH 3.5 for 1.5 h | Acid tolerance, log change in pH 3.5 for 1.5 h | Average acid tolerance, log change in pH 3.5 for 1.5 h |
|---|---|---|---|---|---|---|
| DSM 22091, SD5221, PTA-4797 | 8698 | NCFM | L. acidophilus | −0.1 | −0.1 | −0.1 |
| DSM 32363 | 4022 | LA0893 | L. acidophilus | 0.0 | 0.3 | 0.1 |
| SD 5212 | 9353 | La-11/La-14 | L. acidophilus | −0.4 | 0.0 | −0.2 |
| SD 5214 | 9912 | LBr-35 | L. brevis | −0.5 | 0.1 | −0.2 |
| DSM 32108 | 11864 | LX11864 | L. brevis | −0.2 | | −0.2 |
| DSM 32107 | 11860 | LX11860 | L. brevis | −0.5 | | −0.5 |
| SD 5213 | 9864 | Lc-11 | L. casei | −0.1 | 0.1 | −0.1 |
| DSM 32100 | 4299 | LX1220 | L. crispatus | −0.3 | | −0.3 |
| SD 5589 | 4106 | LB0064 | L. delbrueckii bulgaricus | −0.1 | 0.0 | −0.1 |
| DSM32109 | 11865 | LX11865 | L. fermentum | −0.3 | | −0.3 |
| DSM 32113 | 1753 | 1753 | L. fermentum | −0.1 | −0.1 | −0.1 |
| DSM 32103 | 5111 | LG0179 | L. gasseri | −0.3 | 0.1 | −0.1 |
| SD 5585 | 10687 | LG10687/LG-36 | L. gasseri | 0.0 | 0.1 | 0.1 |
| DSM 32102 | 911 | 911 | L. jensenii | −1.8 | −1.3 | −1.6 |
| PTA-4798 | 4981 | LQ0281/LPC-37 | L. paracasei | −0.1 | | −0.1 |
| SD 5275, PTA-4799, DSM 22266 | 4715 | LP0115 | L. plantarum | −0.1 | −0.1 | −0.1 |

TABLE 6-continued

Results of the acid tolerance studies at pH 3.5 for 1.5 hours.

| Deposit number(s) | DGCC strain number | Other strain code/ commercial ID | Identification | Acid tolerance, log change in pH 3.5 for 1.5 h | Acid tolerance, log change in pH 3.5 for 1.5 h | Average acid tolerance, log change in pH 3.5 for 1.5 h |
|---|---|---|---|---|---|---|
| DSM 22876, SD 5675 | 1460 | 1460/HN001 | L. rhamnosus | 0.0 | 0.0 | 0.0 |
| DSM 22193, SD 5217 | 9913 | Lr-32 | L. rhamnosus | −0.1 | 0.0 | −0.1 |
| DSM 32097 | 11887 | LX11887 | L. paracasei | 0.0 | | 0.0 |
| DSM 32115 | 11881 | LX11881 | L. rhamnosus | 0.7 | | 0.7 |
| PTA-4800 | 9868 | LS-33 | L. salivarius | 0.0 | 0.1 | 0.0 |
| SD 5584 | 8656 | M61/LI-23 | Lactococcus lactis LI-23 | −0.2 | −0.2 | −0.2 |
| | | | L. Rhamnosus LGG | | | −0.1 |
| DSM 32101 | 11795 | Lj34-A | L. jensenii | −1.7 | −.04 | −1.0 |

TABLE 7

Results of the bile tolerance studies in 0.9% oxgall as % of growth in MRS without bile.

| Deposit number(s) | DGCC strain number | Other strain code/ commercial ID | Identification | Bile tolerance, growth in 0.9% oxgall as % of growth in MRS w/o bile | | | Average bile tolerance, growth in 0.9% oxgall as % of growth in MRS w/o bile |
|---|---|---|---|---|---|---|---|
| DSM 32101 | 11795 | Lj34-A | L. jensenii | 0% | 1% | | 1% |
| SD 5589 | 4106 | LB0064 | L. delbrueckii bulgaricus | 5% | 2% | | 3% |
| DSM 32363 | 4022 | LA0893 | L. acidophilus | 9% | 5% | 2% | 5% |
| SD 5584 | 8656 | M61/LI-23 | Lactococcus lactis LI-23 | 1% | 11% | | 6% |
| DSM 32102 | 911 | 911 | L. jensenii | 1% | 18% | | 10% |
| DSM 32100 | 4299 | LX1220 | L. crispatus | 7% | 14% | | 11% |
| DSM 32103 | 5111 | LG0179 | L. gasseri | 19% | 5% | | 12% |
| SD 5585 | 10687 | LG 10687/ LG-36 | L. gasseri | 15% | 16% | | 15% |
| SD 5213 | 9864 | Lc-11 | L. casei | 17% | 15% | | 16% |
| PTA-4800 | 9868 | LS-33 | L. salivarius | 23% | 21% | | 22% |
| PTA-4798 | 4981 | LQ0281/ LPC-37 | L. paracasei | 22% | 23% | | 22% |
| DSM 22876, SD 5675 | 1460 | 1460/ HN001 | L. rhamnosus | 29% | 35% | | 32% |
| DSM 32097 | 11887 | LX11887 | L. paracasei | 29% | 40% | | 35% |
| DSM 22193, SD 5217 | 9913 | Lr-32 | L. rhamnosus | 36% | 35% | | 36% |
| DSM 32115 | 11881 | LX11881 | L. rhamnosus | 44% | 34% | | 39% |
| | | | L. rhamnosus LGG | | | | 40% |
| DSM 32107 | 11860 | LX11860 | L. brevis | 42 % | | | 42% |
| DSM32109 | 11865 | LX11865 | L. fermentum | 34% | 51% | | 43% |
| DSM 32108 | 11864 | LX11864 | L. brevis | 47% | 65% | | 56% |
| SD 5214 | 9912 | LBr-35 | L. brevis | 71% | 77% | | 74% |
| SD 5275, PTA-4799, DSM 22266 | 4715 | LP0115 | L. plantarum | 102% | 117% | | 110% |
| SD 5212 | 9353 | La-11/La-14 | L. acidophilus | 113% | 106% | 113% | 111% |
| DSM 32113 | 1753 | 1753 | L. fermentum | 113% | 114% | | 114% |
| DSM 22091, SD5221, PTA-4797 | 8698 | NCFM | L. acidophilus | 115% | 111% | 116% | 114% |

TABLE 8

Results of the bile tolerance studies in 0.3% oxgall as % of growth in MRS without bile.

| Deposit number(s) | DGCC strain number | Other strain code/ commercial ID | Identification | Bile tolerance, growth in 0.3% oxgall as % of growth in MRS w/o bile | | | Average bile tolerance, growth in 0.3% oxgall as % of growth in MRS w/o bile |
|---|---|---|---|---|---|---|---|
| DSM 32101 | 11795 | Lj34-A | L. jensenii | 1% | 2% | | 1% |
| DSM 22091, SD5221, PTA-4797 | 8698 | NCFM | L. acidophilus | 93% | 91% | 85% | 90% |
| DSM 32363 | 4022 | LA0893 | L. acidophilus | 2% | 3% | 2% | 2% |
| SD 5212 | 9353 | La-11/La-14 | L. acidophilus | 92% | 89% | 85% | 88% |
| SD 5214 | 9912 | LBr-35 | L. brevis | 92% | 93% | | 92% |
| DSM 32108 | 11864 | LX11864 | L. brevis | 76% | 63% | | 70% |
| DSM 32107 | 11860 | LX11860 | L. brevis | 72% | | | 72% |
| SD 5213 | 9864 | Lc-11 | L. casei | 30% | 31% | | 30% |
| DSM 32100 | 4299 | LX1220 | L. crispatus | 10% | 9% | | 10% |
| SD 5589 | 4106 | LB0064 | L. delbrueckii bulgaricus | 9% | 5% | | 7% |
| DSM32109 | 11865 | LX11865 | L. fermentum | 64% | 63% | | 63% |
| DSM 32113 | 1753 | 1753 | L. fermentum | 98% | 94% | | 96% |
| DSM 32103 | 5111 | LG0179 | L. gasseri | 60% | 47% | | 53% |
| SD 5585 | 10687 | LG10687/LG-36 | L. gasseri | 33% | 39% | | 36% |
| DSM 32102 | 911 | 911 | L. jensenii | 2% | 15% | | 8% |
| PTA-4798 | 4981 | LQ0281/LPC-37 | L. paracasei | 46% | 43% | | 45% |
| SD 5275, PTA-4799, DSM 22266 | 4715 | LP0115 | L. plantarum | 85% | 90% | | 88% |
| DSM 22876, SD 5675 | 1460 | 1460/HN001 | L. rhamnosus | 62% | 63% | | 63% |
| DSM 22193, SD 5217 | 9913 | Lr-32 | L. rhamnosus | 70% | 66% | | 68% |
| DSM 32097 | 11887 | LX11887 | L. paracasei | 39% | 68% | | 54% |
| DSM 32115 | 11881 | LX11881 | L. rhamnosus | 58% | 58% | | 58% |
| PTA-4800 | 9868 | LS-33 | L. salivarius | 73% | 68% | | 71% |
| SD 5584 | 8656 | M61/LI-23 | Lactococcus lactis Li-23 | 2% | 8% | | 5% |
| | | | L. rhamnosus LGG | | | | 62.66% |

TABLE 9

Growth in MRS as a control for Tables 7 and 8 above.

| Deposit number | DGCC strain number | Other strain code/ commercial ID | Identification | Growth in MRS, OD (A600) | | | Average growth in MRS, OD (A600) |
|---|---|---|---|---|---|---|---|
| DSM 32101 | 11795 | Lj34-A | L. jensenii | 1.0 | 1.1 | | 1.0 |
| DSM 22091, SD5221, PTA-4797 | 8698 | NCFM | L. acidophilus | 1.1 | 1.1 | 1.1 | 1.1 |
| DSM 32363 | 4022 | LA0893 | L. acidophilus | 1.2 | 1.1 | 1.2 | 1.2 |
| SD 5212 | 9353 | La-11/La-14 | L. acidophilus | 1.1 | 1.1 | 1.1 | 1.1 |
| SD 5214 | 9912 | LBr-35 | L. brevis | 0.9 | 1.0 | | 1.0 |
| DSM 32108 | 11864 | LX11864 | L. brevis | 0.9 | 1.1 | | 1.0 |
| DSM 32107 | 11860 | LX11860 | L. brevis | 0.9 | | | 0.9 |
| SD 5213 | 9864 | Lc-11 | L. casei | 1.2 | 1.2 | | 1.2 |
| DSM 32100 | 4299 | LX1220 | L. crispatus | 1.1 | | | 1.1 |
| SD 5589 | 4106 | LB0064 | L. delbrueckii bulgaricus | 1.1 | 1.1 | | 1.1 |
| DSM32109 | 11865 | LX11865 | L. fermentum | 1.0 | 0.9 | | 0.9 |
| DSM 32113 | 1753 | 1753 | L. fermentum | 1.1 | 1.0 | | 1.0 |
| DSM 32103 | 5111 | LG0179 | L. gasseri | 1.1 | 1.0 | | 1.0 |
| SD 5585 | 10687 | LG10687/LG-36 | L. gasseri | 1.0 | 1.0 | | 1.0 |
| DSM 32102 | 911 | 911 | L. jensenii | 0.9 | 0.9 | | 0.9 |
| PTA-4798 | 4981 | LQ0281/LPC-37 | L. paracasei | 1.2 | 1.1 | | 1.1 |

TABLE 9-continued

Growth in MRS as a control for Tables 7 and 8 above.

| Deposit number | DGCC strain number | Other strain code/ commercial ID | Identification | Growth in MRS, OD (A600) | | Average growth in MRS, OD (A600) |
|---|---|---|---|---|---|---|
| SD 5275, PTA-4799, DSM 22266 | 4715 | LP0115 | L. plantarum | 1.2 | 1.2 | 1.2 |
| DSM 22876, SD 5675 | 1460 | 1460/HN001 | L. rhamnosus | 1.2 | 1.2 | 1.2 |
| DSM 22193, SD 5217 | 9913 | Lr-32 | L. rhamnosus | 1.2 | 1.2 | 1.2 |
| DSM 32097 | 11887 | LX11887 | L. paracasei | 1.0 | 1.0 | 1.0 |
| DSM 32115 | 11881 | LX11881 | L. rhamnosus | 1.1 | 1.2 | 1.2 |
| PTA-4800 | 9868 | LS-33 | L. salivarius | 1.3 | 1.3 | 1.3 |
| SD 5584 | 8656 | M61/LI-23 | Lactococcus lactis Li-23 | 1.0 | 1.1 | 1.1 |
| | | | L. rhamnosus LGG | | | 1.177 |

TABLE 10

Strains grouped in accordance with their applications according to criteria as defined in table 2.

| Area | Properties | Strains performing better than control strain |
|---|---|---|
| Urogenital | Adhesion to vaginal cells | DSM 32101 |
| | | DSM 32108 |
| | | DSM 32107 |
| | | DSM 32100 |
| | | DSM 32109 |
| | | DSM 32113 |
| | | DSM 32103 |
| | | DSM 32102 |
| | | DSM 32097 |
| | | DSM 32115 |
| Urogenital | H₂O₂ production + adhesion to vaginal cells | DSM 32101 |
| | | DSM 32108 |
| | | DSM 32100 |
| | | DSM 32109 |
| | | DSM 32113 |
| | | DSM 32103 |
| | | DSM 32102 |
| | | DSM 32097 |
| | | DSM 32115 |
| Urogenital + GI-tract | H₂O₂ production + adhesion to vaginal cells + bile and/or acid resistance | DSM 32108 |
| | | +DSM32109 |
| | | DSM 32113 |
| | | DSM 32103 |
| | | DSM 32097 |
| | | DSM 32115 |

TABLE 11

Fatty acid production of strains.

| Strain | Species | Acetic acid production, μmol/ml | Propionic acid production, μmol/ml | Lactic acid production, μmol/ml |
|---|---|---|---|---|
| DSM 32108 | L. brevis | 37.1 | <0.1 | 79.8 |
| DSM 32100 | L. crispatus | 36.1 | <0.1 | 34.5 |
| DSM 32113 | L. fermentum | 38.0 | 0.11 | 102.1 |
| DSM 32103 | L. gasseri | 30.1 | <0.1 | 50.2 |
| DSM 32102 | L. jensenii | 33.5 | <0.1 | 36.6 |
| DSM 32115 | L. casei gr. | 34.1 | <0.1 | 209.0 |

Example 3

The ability of the supernatant of selected strains to inhibit the growth of pathogens was measured. Of the 9 tested pathogens, 5 pathogens (*G. vaginalis* strains CCUG 3717T, CCUG 44114, CCUG 44159, *Atopobium vaginae* strains CCUG 38953T, CCUG 44156) were growing adequately in the applied media, GEM supplemented with 10% horse serum (FIG. 1). Results for the strains showing sufficient growth in the test conditions are presented in FIG. 1.

Figure 2:
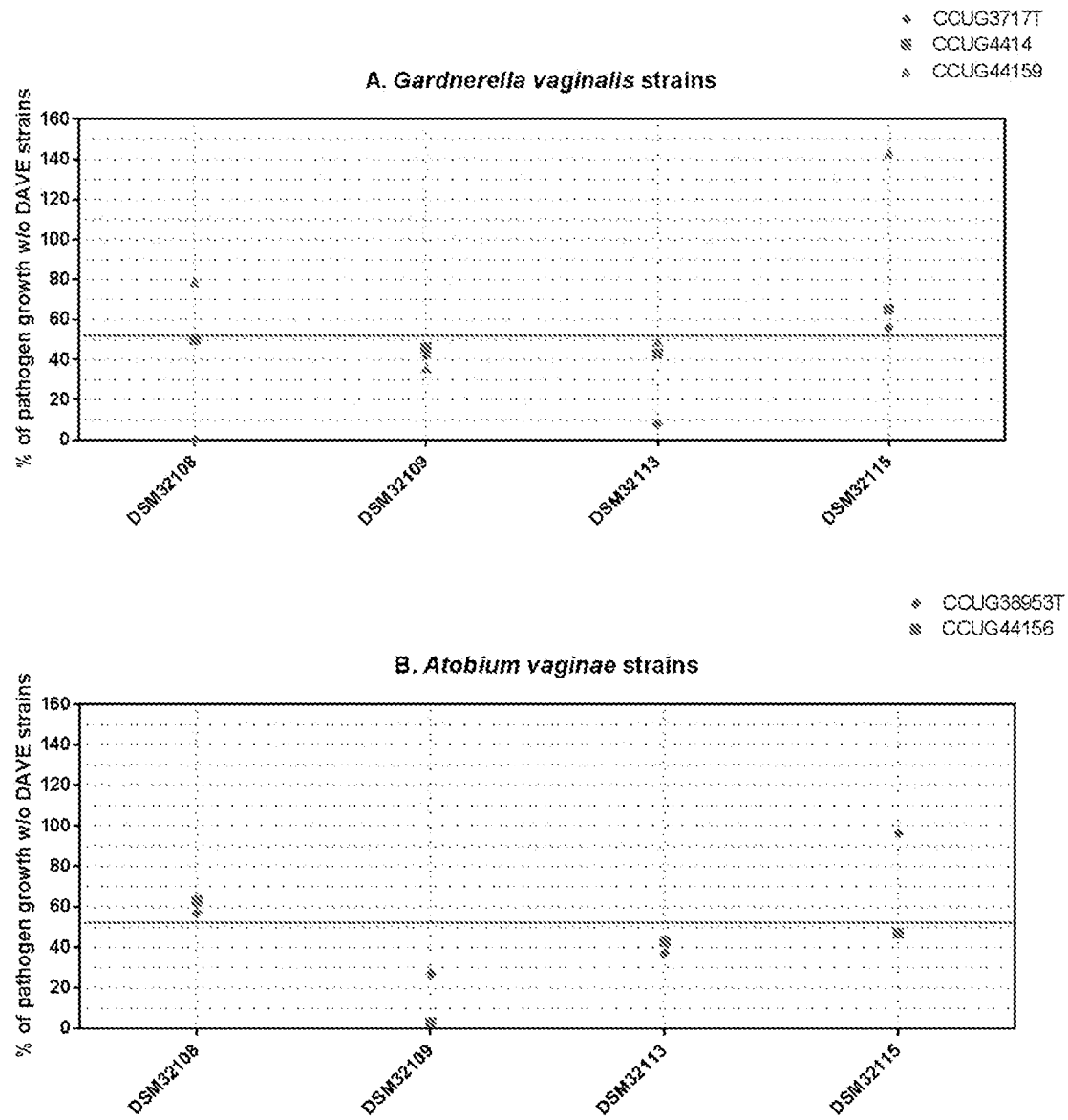
FIG. 2. shows growth of *Gardnerella vaginalis* (A) and *Atopobium vaginae* (B) strains by supernatants of test strains. The number presented in the second row of horizontal title shows the pH of GEM media after 48 h cultivation of the test strain. The red line indicates the 50% inhibition.

All pathogens growing on GEM were inhibited by the supernatants of at least one strain. In particular, strains DSM 32109 and DSM 32113 inhibited well the growth of all tested pathogens (FIG. 2). The pH of culture media of the strains after 48 h cultivation was measured (FIG. 2), and in these strains pH varied from 4.3 to 4.5. The inhibition was not correlating with the pH suggesting that the pH decrease does not solely explain the growth inhibition results.

Example 4

Urogenital Infection Acute Model

Female 057B1/6 mice (6-8 weeks old) are injected intraperitoneally with 0.5 mg beta-estradiol in 100 μl oil carrier three days prior to and on the day of vaginal inoculation. Mice are anaesthetized with isofluorane and inoculated intravaginally with ~5×10$^7$ CFU streptomycin-resistant *Gardenella vaginalis* in 20 μl sterile PBS (OD$_{600}$≈5.0) with or without probiotic at a dose of 10$^6$, 10$^6$, 10$^7$, 10$^8$ and/or 10$^9$ CFU/mouse.

Example 2

The acetic, propionic, isobutyric, butyric, 2-methylbutyric, isovaleric, lactic acid and valeric acid production was measured for some strains. The results are presented in Table 11. The strains have differences in the ability to produce lactic acid, DSM 32115 produces lactic acid more than or about 200 μmol/ml, DSM 32113 produces between 100 and 200 μmol/ml. Rest of the strains produce below 100 μmol/ml.

At 24 and 72 h post infection, vaginal washes are collected by flushing vaginas with 50 µL sterile PBS using a 200 µl pipet, pipetting up and down 10×, followed by rinsing into an additional 10 µL PBS in a sterile Eppendorf tube. Vaginal washes and tissues are analyzed for *G. vaginalis*, sialidase activity, inflammation and/or epithelial exfoliation.

Analysis of *G. Vaginalis*

Vaginal washes and uterine tissues are analyzed for *G. vaginalis* with qPCR.

Sialidase Activity

Vaginal wash samples are diluted 1:2 with 100 mM sodium acetate (pH 5.5) containing 300 µM 4-methylumbellliferyl-Neu5Ac (50 µL). Substrate hydrolysis is quantified with a plate reader.

Epithelial Exfoliation and Inflammation

Vaginal sections are embedded in paraffin, and histology sections are stained with haematoxylin and eosin and visualized under a microscope to assess the degree of inflammation and epithelial exfoliation. Images are captured for measurement of epithelial thickness.

For assessment of epithelial exfoliation in mouse vaginal washes, 5 µL of vaginal wash is visualized under a microscope. Five representative images are captured from each sample and epithelial cells are counted from each image for an average degree of exfoliation.

Additional information can be found in Gilbert et al. Clinical features of bacterial vaginosis in a murine model of vaginal infection with *Gardenella vaginalis*. PLoS One 2013;8(3):e59539, which is incorporated herein by reference.

Example 5

Urogenital Infection Prevention Model

Female C57Bl/6 mice (6-8 weeks old) are gavaged with probiotic (daily dose of $10^7$, $10^8$ and/or $10^9$ CFU) or vehicle for 2 weeks prior to inoculation.

The mice are then injected intraperitoneally with 0.5 mg beta-estradiol in 100 µl oil carrier three days prior to and on the day of inoculation. Mice are anaesthetized with isofluorane and inoculated vaginally with ~5×$10^7$ CFU streptomycin-resistant Gardenella vaginalis in 20 µl sterile PBS ($OD_{600}$≈5.0).

At 24 and 72 h post infection, vaginal washes are collected by flushing vaginas with 50 µL sterile PBS using a 200 µl pipet, pipetting up and down 10×, followed by rinsing into an additional 10 µL PBS in a sterile Eppendorf tube. Vaginal washes and tissues are analyzed for *G. vaginalis*, sialidase activity and/or epithelial exfoliation as described above.

Additional information may be found at Gilbert et al. Clinical features of bacterial vaginosis in a murine model of vaginal infection with *Gardenella vaginalis*. PLoS One 2013;8(3):e59539, which is incorporated herein by reference.

All documents referred to herein are hereby incorporated by reference in their entirety, with special attention to the subject matter for which they are referred. Various modifications and variations of the described aspects of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in the field are intended to be within the scope of the following claims.

The invention claimed is:

1. A method for inhibiting the effect of urogenital tract pathogens by enhancing vaginal immunity by rendering the vaginal environment less receptive to pathogens, wherein:
   the method comprises:
   administering to a subject in need thereof a pharmaceutically effective amount of bacteria or a metabolite thereof; and
   the bacteria comprise:
   *Lactobacillus jensenii* DSM 32101, *Lactobacillus brevis* DSM 32108, *Lactobacillus brevis* DSM 32107, *Lactobacillus crispatus* DSM 32100, *Lactobacillus fermentum* DSM32109, *Lactobacillus fermentum* DSM 32113, *Lactobacillus gasseri* DSM 32103, *Lactobacillus jensenii* DSM 32102, *Lactobacillus paracasei* DSM 32097 or *Lactobacillus rhamnosus* DSM 32115;
   wherein the *Lactobacillus jensenil* DSM 32101, the *Lactobacillus brevis* DSM 32108, the *Lactobacillus crispatus* DSM 32100, the *Lactobacillus fermentum* DSM32109, the *Lactobacillus fermentum* DSM 32113, the *Lactobacillus gasseri* DSM 32103, the *Lactobacillus jensenii* DSM 32102, or the *Lactobacillus rhamnosus* DSM 32115, all being characterized as having:
   a) a binding affinity in an assay for in vitro vaginal cell adhesion of at least 1.0 when compared to *Lactobacillus helveticus* LH0138, and
   b) a hydrogen peroxide production level of more than 1128581 measured as fluorescence counts produced during 1.5 hours when determined in a hydrogen peroxide production assay and/or a level higher than that of *Lactobacillus reuteri* RC-14; or wherein the *Lactobacillus brevis* DSM 32107 or the *Lactobacillus paracasei* DSM 32097 is characterized as having the binding affinity in the assay for the in vitro vaginal cell adhesion of the at least 1.0 when compared to the *Lactobacillus helveticus* LH0138.

2. The method according to claim 1, wherein the bacteria comprise *Lactobacillus jensenii* DSM 32101.

3. The method according to claim 1, wherein the bacteria comprise *Lactobacillus crispatus* DSM 32100.

4. The method according to claim 1, wherein the bacteria comprise *Lactobacillus fermentum* DSM 32109.

5. The method according to claim 1, wherein the bacteria comprise *Lactobacillus fermentum* DSM 32113.

6. The method according to claim 1, wherein the bacteria comprise *Lactobacillus jensenii* DSM 32102.

7. The method according to claim 1, wherein the method inhibits the effect of urogenital tract pathogens in bacterial vaginosis by enhancing vaginal immunity.

* * * * *